(12) United States Patent
Tsuchida

(10) Patent No.: US 11,316,429 B2
(45) Date of Patent: Apr. 26, 2022

(54) SWITCHING REGULATOR CIRCUIT TO CONVERT INPUT DC VOLTAGE TO OUTPUT DC VOLTAGE WITH SETTING A SWITCHING FREQUENCY ACCORDING TO LOAD CURRENT

(71) Applicant: FANUC CORPORATION, Yamanashi (JP)

(72) Inventor: Kunio Tsuchida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 35 days.

(21) Appl. No.: 16/902,273

(22) Filed: Jun. 16, 2020

(65) Prior Publication Data

US 2020/0412246 A1 Dec. 31, 2020

(30) Foreign Application Priority Data

Jun. 26, 2019 (JP) .............................. JP2019-118812

(51) Int. Cl.
*H02M 3/158* (2006.01)
*H02M 1/08* (2006.01)

(52) U.S. Cl.
CPC ............. *H02M 3/158* (2013.01); *H02M 1/08* (2013.01)

(58) Field of Classification Search
CPC .... H02M 3/156; H02M 3/158; H02M 1/0032; H02M 1/0054; H02M 1/08; Y02B 70/10
See application file for complete search history.

(56) References Cited

U.S. PATENT DOCUMENTS

| | | | |
|---|---|---|---|
| 8,994,346 B2 * | 3/2015 | Rahardjo | H02M 3/156 323/267 |
| 9,178,427 B1 * | 11/2015 | Szolusha | H02M 3/158 |
| 9,639,171 B2 * | 5/2017 | Yayama | H02P 27/00 |

FOREIGN PATENT DOCUMENTS

| | | |
|---|---|---|
| JP | H974343 A | 3/1997 |
| JP | 2012217336 A | 11/2012 |
| JP | 2016152716 A | 8/2016 |

* cited by examiner

*Primary Examiner* — Kyle J Moody
*Assistant Examiner* — Jye-June Lee
(74) *Attorney, Agent, or Firm* — Hauptman Ham, LLP

(57) ABSTRACT

A switching regulator circuit to convert an inputted first voltage to a second voltage by turning on and off a switching device and to output the second voltage to a load includes: a load current determination unit configured to determine a level of a load current passing the load connected to the switching regulator circuit; a switching frequency setting unit configured to set a switching frequency for the switching device according to a result of determination by the load current determination unit; and a switching control unit configured to turn on and off the switching device at the switching frequency set by the switching frequency setting unit.

9 Claims, 9 Drawing Sheets

FIG. 4

| LEVEL OF LOAD CURRENT | SMALLER THAN 500mA | NOT SMALLER THAN 500mA AND SMALLER THAN 2A | NOT SMALLER THAN 2A |
|---|---|---|---|
| SWITCHING FREQUENCY TO BE SET | 2MHz | 900kHz | 150kHz |
| RIPPLE CURRENT | 200mA | 440mA | 2.7A |

SWITCHING REGULATOR CIRCUIT TO CONVERT INPUT DC VOLTAGE TO OUTPUT DC VOLTAGE WITH SETTING A SWITCHING FREQUENCY ACCORDING TO LOAD CURRENT

RELATED APPLICATIONS

The present application claims priority to Japanese Application Number 2019-118812, filed Jun. 26, 2019, the disclosure of which is hereby incorporated by reference herein in its entirety.

BACKGROUND OF THE INVENTION

1. Field of the Invention

The present invention relates to a switching regulator circuit to convert an input DC voltage to an output DC voltage.

2. Description of the Related Art

Switching regulator circuits are widely used as power supply apparatuses to supply stable DC power supply voltage to a load (an apparatus). A switching regulator circuit converts a DC voltage inputted thereto into a different DC voltage by turning on and off the switching devices thereof and outputs the converted voltage to the load. A switching regulator circuit includes a switching device such as a field effect transistor (FET), a coil (inductor), and a capacitor.

As a switching regulator circuit outputs a stable DC voltage, the current supplied to the load connected to the switching regulator circuit (hereinafter referred to "load current") changes in a manner depending on the types and the number of the loads connected to the switching regulator circuit. Further, as a switching regulator circuit turns on and off the switching devices thereof at a designated switching frequency, a ripple current related to the switching frequency is included in the load current. The ratio of the ripple current to the load current changes in a manner depending on the combination of the switching frequency and the inductance of the coil. Normally, a switching frequency and an inductance of the coil are selected in such a manner as to keep the ratio of the ripple current to the maximum load current at a certain fixed value.

For example, Japanese Unexamined Patent Publication No. H09-074343 discloses a current restricting circuit to control a load current by performing ON/OFF control on a switching device, including: detection means for detecting a load current; comparison means for comparing a result of detection by the detection means with a maximum value set for the load current in advance; OFF control means for turning off the switching device when the comparison means detects that the load current has exceeded the maximum value; and ON control means for turning on the switching device at a designated cycle.

For example, Japanese Unexamined Patent Publication No. 2012-217336 discloses a switching regulator including: a power switch coupled between first and second terminals, the first terminal to be coupled to an energy transfer element of a power supply and the second terminal to be coupled to a supply rail of the power supply; and a control circuit coupled to a third terminal and the power switch, the third terminal to be coupled to an output of the power supply, the control circuit coupled to generate a feedback signal responsive to the output of the power supply, the control circuit coupled to switch the power switch in response to the feedback signal, the control circuit coupled to switch the power switch at a fixed switching frequency for a first range of feedback signal values, the control circuit coupled to vary a switching frequency of the power switch without skipping cycles in response to the feedback signal for a second range of feedback signal values, wherein the control circuit includes a feedback signal circuit coupled to the third terminal, the feedback signal circuit coupled to generate the feedback signal, and a pulse width modulator circuit coupled to switch the power switch in response to the feedback signal, and wherein on-time and off-time values of a drive signal generated by the pulse width modulator circuit to switch the power switch vary simultaneously as a function of a level of a load coupled to the output of the power supply to vary the switching frequency of the power switch without skipping cycles for the second range of feedback signal values.

For example, Japanese Unexamined Patent Publication No. 2016-152716 discloses a power supply control apparatus including: a switching power supply (11, 51, 52) configured to output DC voltage at a designated voltage value and to vary the output voltage by changing switching frequency; a determination unit (20, 22, 24) that acquires information related to the switching frequency and, based on the acquired information, identifies as target electromagnetic noise at least one of electromagnetic noise having an identical frequency to the switching frequency and $n_{th}$ order electromagnetic noise having a frequency n-times the switching frequency (n is a natural number not smaller than two), and determines whether or not any of the at least one target electromagnetic noise may affect an operation of a designated apparatus (103) having a designated frequency as an operational parameter, at the designated frequency; and a load controlling unit (20, 22, 24) configured to increase or decrease power consumption of at least one designated load (34, 41, 61) among at least one load that operates with supply of power from the switching power supply when the determination unit has determined that any of the at least one target electromagnetic noise may affect an operation of the designated apparatus at the designated frequency.

SUMMARY OF INVENTION

As described above, the level of the load current outputted by a switching regulator circuit having a stable output DC voltage and supplied to a load depends on the types and the number of the loads connected to the switching regulator circuit. When the switching frequency is fixed for the switching regulator circuit, a larger load current leads to an increased heat emission from the switching device. On the other hand, when the switching frequency is set at a lower value to suppress heat emission, the ripple current increases. In particular, when the load current is small, a large ripple current occurs, causing the load current to be negative in some periods. In the case of a switching regulator circuit with non-synchronous rectification, the operation of the switching regulator circuit will be unstable because no load current flows from the switching regulator circuit to the load during the periods in which the load current is negative. In the case of a switching regulator circuit with synchronous rectification, the efficiency declines because the load current flows backward from the load to the switching regulator circuit during the periods in which the load current is negative.

Further, it is also conceivable to adopt a technique to perform real time monitoring of the level of the load current outputted from the switching regulator circuit and to vary the switching frequency. However, the output voltage from the switching regulator circuit is unstable while the switching frequency is being changed and this will adversely affect the operation of the load (apparatus) connected to the switching regulator circuit.

Therefore, a switching regulator circuit suitable for the load connected thereto is desired.

According to one aspect of the present disclosure, a switching regulator circuit to convert an inputted first voltage to a second voltage by turning on and off a switching device and to output the second voltage to a load includes: a load current determination unit configured to determine a level of a load current passing the load connected to the switching regulator circuit; a switching frequency setting unit configured to set a switching frequency for the switching device according to a result of determination by the load current determination unit; and a switching control unit configured to turn on and off the switching device at the switching frequency set by the switching frequency setting unit.

BRIEF DESCRIPTION OF THE DRAWINGS

The present invention will be more clearly understood with reference to the following accompanying drawings:

FIG. 4 is a table illustrating the relations between the switching frequencies to be set for a switching regulator circuit with synchronous rectification according to one embodiment of the present disclosure, load currents, and ripple currents;

DETAILED DESCRIPTION

Figure 1:
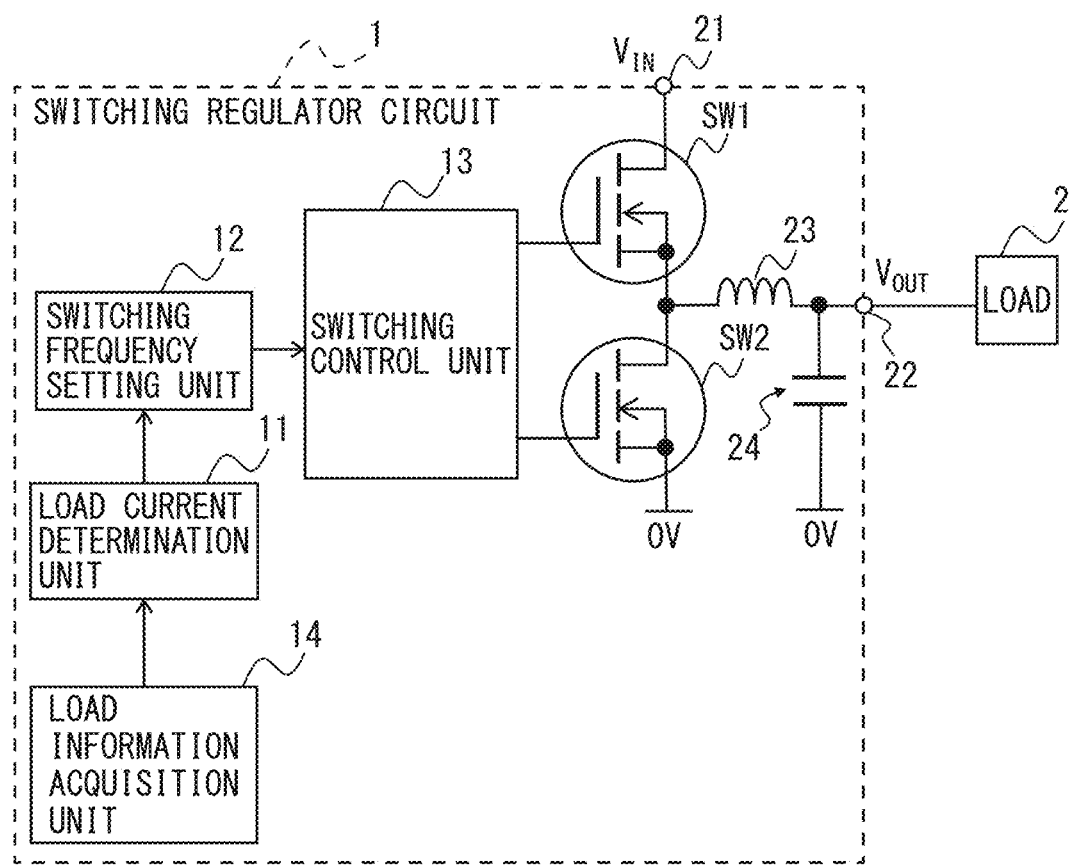
FIG. 1 is a diagram illustrating a switching regulator circuit with synchronous rectification according to one embodiment of the present disclosure.

A switching regulator circuit to convert an input DC voltage to an output DC voltage will be described below with reference to the attached drawings. To facilitate understanding, the drawings are presented with different scales as appropriate. The embodiments illustrated in the drawings are merely illustrative and the present invention is not limited to the embodiments illustrated in the drawings.

FIG. 1 is a diagram illustrating a switching regulator circuit with synchronous rectification according to one embodiment of the present disclosure.

A switching regulator circuit 1 with synchronous rectification will be described as an example. The switching regulator circuit 1 with synchronous rectification includes switching devices SW1 and SW2 such as field effect transistors (FETs), an input terminal 21, an output terminal 22, a coil 23, and a capacitor 24. The switching regulator circuit 1 with synchronous rectification converts an input voltage $V_{in}$, which is a first DC voltage inputted thereto via the input terminal 21, to an output voltage $V_{out}$, which is a second DC voltage, by turning on and off the switching device SW1 and the switching device SW2 alternatingly and outputs the output voltage $V_{out}$ via the output terminal 22. The level of the output voltage $V_{out}$ can be adjusted by changing the duty ratio of the ON/OFF operations for the switching device SW1 and the switching device SW2. For example, the switching regulator circuit 1 can output an output voltage $V_{out}$ of 5 V in response to an input voltage $V_{in}$ of 24 V. Since the switching regulator circuit 1 outputs a stable output voltage $V_{out}$, the load current, i.e., the current supplied to the load connected to the switching regulator circuit, varies in a manner depending on the types and the number of the loads connected to the switching regulator circuit.

The switching regulator circuit 1 according to the present embodiment includes a load current determination unit 11, a switching frequency setting unit 12, a switching control unit 13, and a load information acquisition unit 14.

When the switching regulator circuit 1 is turned on, the load information acquisition unit 14 acquires information on the load current that passes the load connected to the switching regulator circuit 1.

The load current determination unit 11 determines the level of the load current, based on the information on the load current acquired by the load information acquisition unit 14. For example, the load current determination unit 11 determines the level of the load current, based on a comparison of the load current with at least one threshold value. The threshold value may be selected as appropriate taking into consideration the allowable levels of ripple current and heat emission in the environment the switching regulator circuit 1 is applied.

The switching frequency setting unit 12 sets a switching frequency for the switching devices SW1 and SW2 according to the result of determination by the load current determination unit 11. The level of the load current outputted from the switching regulator circuit 1 depends on the types and the number of the loads connected to the switching regulator circuit 1. In the present embodiment, a low switching frequency is set when the load current is large, in order to suppress the heat emission from the switching devices SW1 and SW2. Conversely, a high switching frequency is set when the load current is small, in order to reduce the ratio of the ripple current to the load current. In other words, according to the present embodiment, the switching frequency setting unit 12 sets the switching frequency at a lower value for a larger load current. In other words, the switching frequency setting unit 12 sets the switching frequency at a higher value for a smaller load current.

The switching control unit 13 turns on and off the switching devices SW1 and SW2 at the switching frequency set by the switching frequency setting unit 12.

Figure 2:
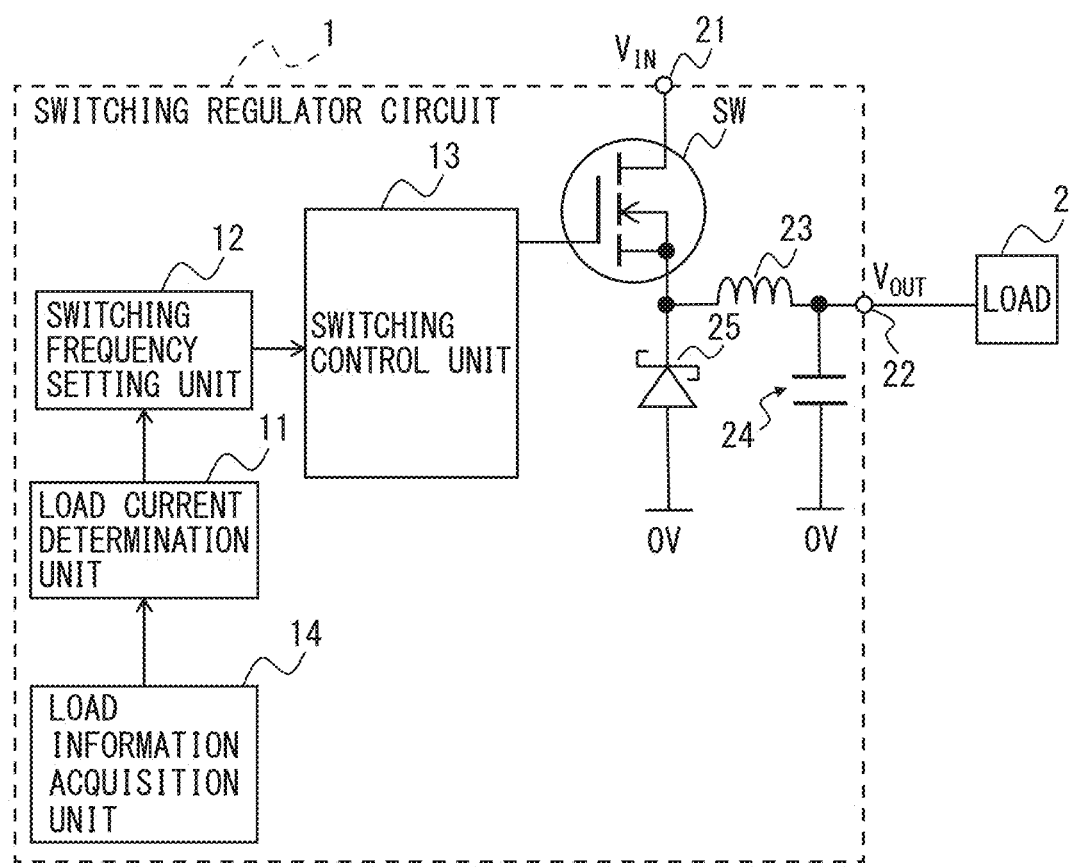
FIG. 2 is a diagram illustrating a switching regulator circuit with non-synchronous rectification according to one embodiment of the present disclosure.

Further, one embodiment of the present disclosure is applicable not only to the switching regulator circuit 1 with synchronous rectification illustrated in FIG. 1 but also to a switching regulator circuit with non-synchronous rectification. FIG. 2 is a diagram illustrating a switching regulator circuit with non-synchronous rectification according to one embodiment of the present disclosure. A switching regulator circuit 1 with non-synchronous rectification includes a switching device SW such as a field effect transistor (FET), an input terminal 21, an output terminal 22, a coil 23, and a capacitor 24. The switching regulator circuit 1 with non-synchronous rectification converts an input voltage $V_{in}$, which is a first DC voltage inputted thereto via the input terminal 21, to an output voltage $V_{out}$, which is a second DC voltage, by turning on and off the switching device SW and outputs the output voltage $V_{out}$ via the output terminal 22. The level of the output voltage $V_{out}$ can be adjusted by changing the duty ratio of the ON/OFF operations for the switching device SW.

The load current determination unit 11, the switching frequency setting unit 12, the switching control unit 13, and the load information acquisition unit 14 may be configured by, for example, a software program or a combination of various electronic circuits and a software program. For example, when these are configured by a software program, the functions of the above-described units can be carried out by operating arithmetic processing units such as ASIC, DSP, or FPGA according to the software program. For example, the switching control unit 13 can be configured by a control IC. Alternatively, the switching frequency setting unit 12, the switching control unit 13, and the load information acquisition unit 14 may be configured by a semiconductor integrated circuit with a software program written therein for carrying out the functions of these units.

Next, an operation of the switching regulator circuit 1 according to one embodiment of the present disclosure will be described more in detail.

The load current determination unit 11 determines the level of the load current, based on an comparison of the load current with at least one threshold value and the switching frequency setting unit 12 sets the switching frequency at a lower value for a larger load current, based on the result of determination by the load current determination unit 11. Here, as an example, a case will be described in which the level of the load current is determined by comparing the load current with two threshold values $I_{th1}$ and $I_{th2}$ to set three switching frequencies.

Figure 3:
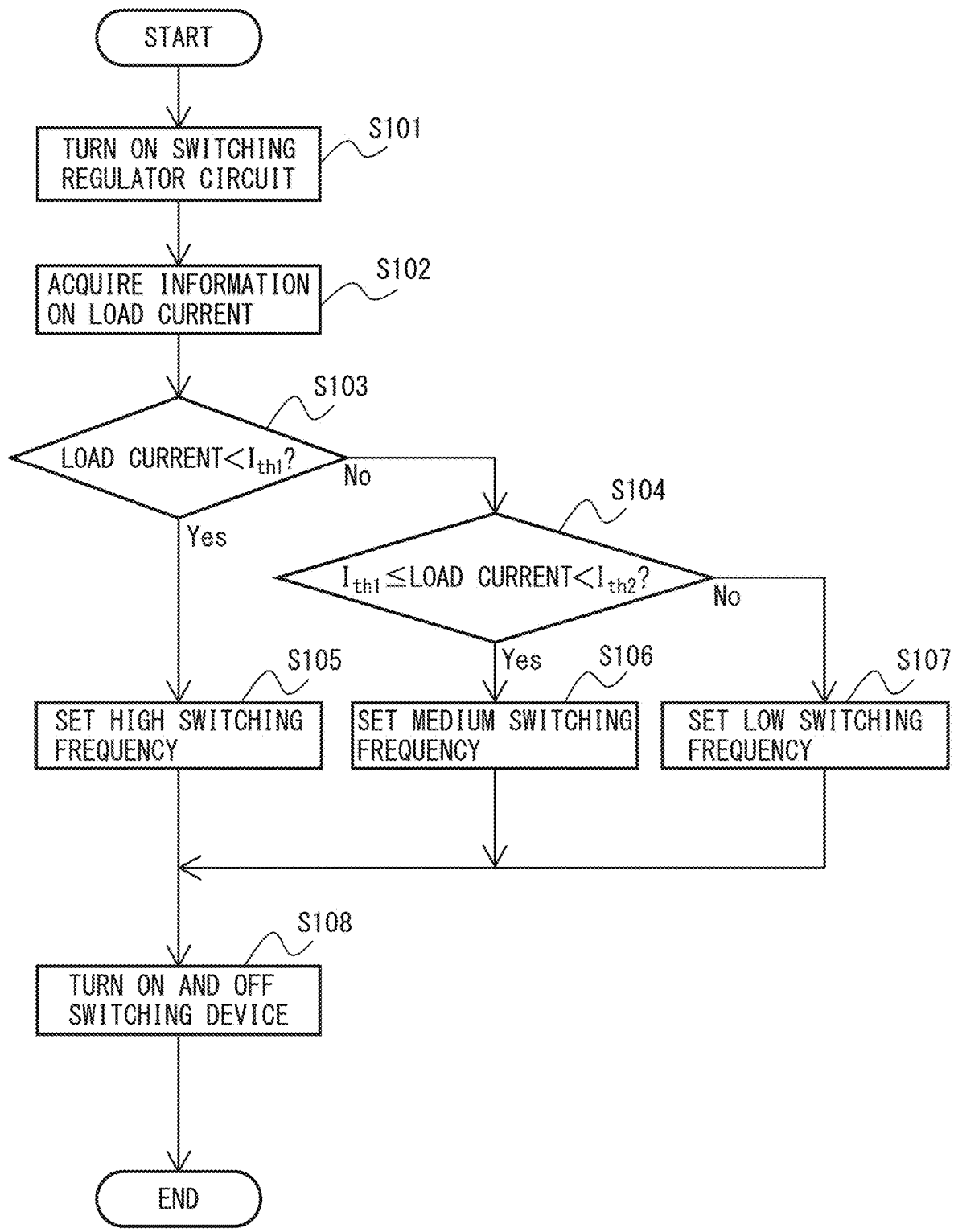
FIG. 3 is a flow chart for describing an operation of a switching regulator circuit according to one embodiment of the present disclosure.

FIG. 3 is a flow chart for describing an operation of a switching regulator circuit according to one embodiment of the present disclosure.

At Step S101, the switching regulator circuit 1 is turned on. The load current determination unit 11, the switching frequency setting unit 12, the switching control unit 13, and the load information acquisition unit 14 in the switching regulator circuit 1 operate with the power supplied from the machine apparatus (e.g., motor drive apparatus) for which the switching regulator circuit 1 is provided. When the switching regulator circuit 1 is turned on, the load current determination unit 11, the switching frequency setting unit 12, the switching control unit 13, and the load information acquisition unit 14 start to operate.

At Step S102, the load information acquisition unit 14 acquires information on the load current passing the load connected to the switching regulator circuit 1.

At Step S103 and Step S104, the load current determination unit 11 compares the load current with two threshold values $I_{th1}$ and $I_{th2}$ and determines the level of the load current. The second threshold value $I_{th2}$ is set at a value greater than the first threshold value $I_{th1}$.

When it has been determined that the load current is smaller than the first threshold value $I_{th1}$ as the result of the comparison at Step S103 by the load current determination unit 11, the next step is Step S105 and, when it has been determined that the load current is not smaller than the first threshold value $I_{th1}$, the next step is Step S104.

When it has been determined that the load current is not smaller than the first threshold value $I_{th1}$ and smaller than the second threshold value $I_{th2}$ as the result of the comparison at Step S104 by the load current determination unit 11, the next step is Step S106 and, when it has been determined that the load current is not smaller than the second threshold value $I_{th2}$, the next step is Step S107.

The switching frequency setting unit 12 sets a high switching frequency at Step S105, a medium switching frequency lower than the high switching frequency at Step S106, and a low switching frequency lower than the medium switching frequency at Step S107. In other words, in this example, the relation "high switching frequency (Step S105)>medium switching frequency (Step S106)>low switching frequency (Step S107)" holds with respect to the levels of the switching frequencies to be set by the switching frequency setting unit 12. The switching control unit 13 is notified of the switching frequency set by the switching frequency setting unit 12 at one of Steps S105 to S107.

At Step S108, the switching control unit 13 turns on and off the switching device (SW1 and SW2 in the case of synchronous rectification as illustrated in FIG. 1, SW in the case of non-synchronous rectification as illustrated in FIG. 2) at the switching frequency set by the switching frequency setting unit 12. Due to the switching operation of the switching device by the switching control unit 13, the input voltage $V_{in}$, which is a first DC voltage inputted via the input terminal 21, is converted to the output voltage $V_{out}$, which is a second DC voltage, and outputted via the output terminal 22.

FIG. 4 is a table illustrating the relations between the switching frequencies to be set for a switching regulator circuit with synchronous rectification according to one embodiment of the present disclosure, load currents, and ripple currents. Here, as an example, in the switching regulator circuit 1 with synchronous rectification illustrated in FIG. 1, it is assumed that the inductance of the coil 23 is 10 µH, the input voltage $V_{in}$ is 24 V, the output voltage $V_{out}$ is 5 V. Further, as for the two threshold values to be used for the comparison with the load current by the load current determination unit 11, it is assumed that the first threshold value $I_{th1}$=500 mA and the second threshold value $I_{th2}$=2 A. It is further assumed that the switching frequency setting unit 12 sets one of the high switching frequency, which is 2

MHz, a medium switching frequency, which is 900 kHz, and the low switching frequency, which is 150 kHz.

In the example illustrated in FIG. 4, when the load current determination unit 11 has determined that the load current is smaller than the first threshold value $I_{th1}$, i.e., 500 mA, the switching frequency setting unit 12 sets the high switching frequency, i.e., 2 MHz. In this case the ripple current that occurs in the load current is, for example, 200 mA. When the load current determination unit 11 has determined that the load current is not smaller than the first threshold value $I_{th1}$, i.e., 500 mA and smaller than the second threshold value $I_{th2}$, i.e., 2 A, the switching frequency setting unit 12 sets the medium switching frequency, i.e., 900 kHz. In this case the ripple current that occurs in the load current is, for example, 440 mA. When the load current determination unit 11 determines that the load current is not smaller than the second threshold value $I_{th2}$, i.e., 2 A, the switching frequency setting unit 12 sets the low switching frequency, i.e., 150 kHz. In this case the ripple current that occurs in the load current is, for example, 2.7 A. As described above, as a lower switching frequency is set, the ripple current occurring in the load current will be larger and, as a higher switching frequency is set, the ripple current occurring in the load current will be smaller. Note that the present embodiment is not limited to the values listed in FIG. 4, which are listed purely as examples, and may take other values.

Figure 5A:
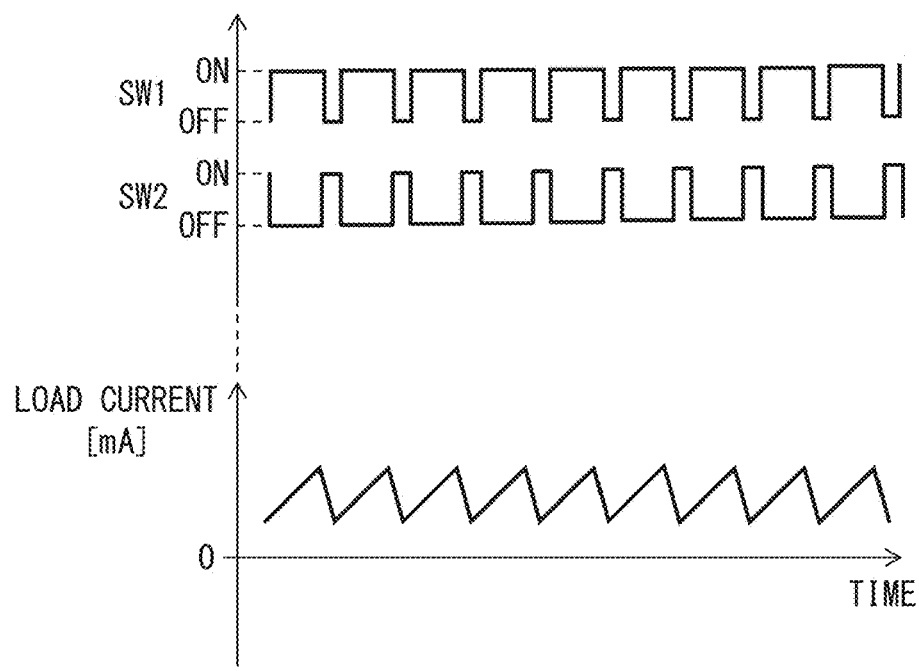
FIG. 5A is a waveform chart illustrating the relation between the switching command for a switching regulator circuit with synchronous rectification according to one embodiment of the present disclosure and the ripple current that occurs in the load current when the switching device is turned on and off at a high switching frequency.
Figure 5B:
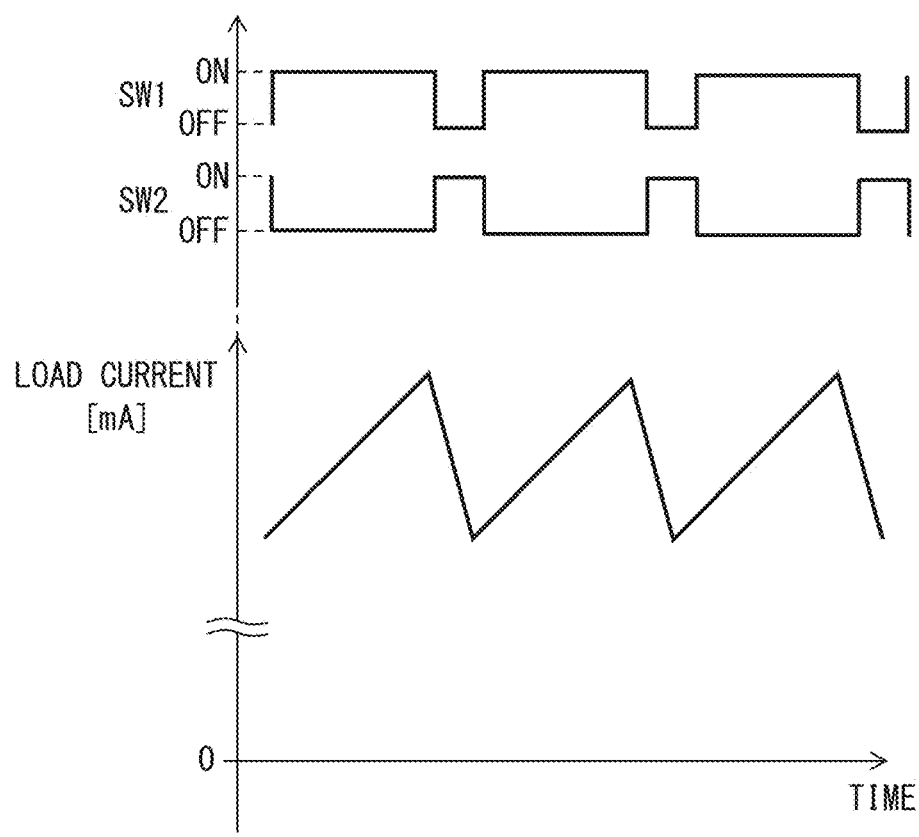
FIG. 5B is a waveform chart illustrating the relation between the switching command for a switching regulator circuit with synchronous rectification according to one embodiment of the present disclosure and the ripple current that occurs in the load current when the switching device is turned on and off at a low switching frequency.

FIG. 5A is a waveform chart illustrating the relation between the switching command for a switching regulator circuit with synchronous rectification according to one embodiment of the present disclosure and the ripple current that occurs in the load current when the switching device is turned on and off at a high switching frequency. FIG. 5B is a waveform chart illustrating the relation between the switching command for a switching regulator circuit with synchronous rectification according to one embodiment of the present disclosure and the ripple current that occurs in the load current when the switching device is turned on and off at a low switching frequency. As illustrated in FIG. 5A, when the load current is small, a high switching frequency is set for the switching devices SW1 and SW2 to reduce the ripple current occurring in the load current. As illustrated in FIG. 5B, when the load current is large, a low switching frequency is set for the switching devices SW1 and SW2 to suppress the heat emission from the switching devices SW1 and SW2.

Figure 6A:
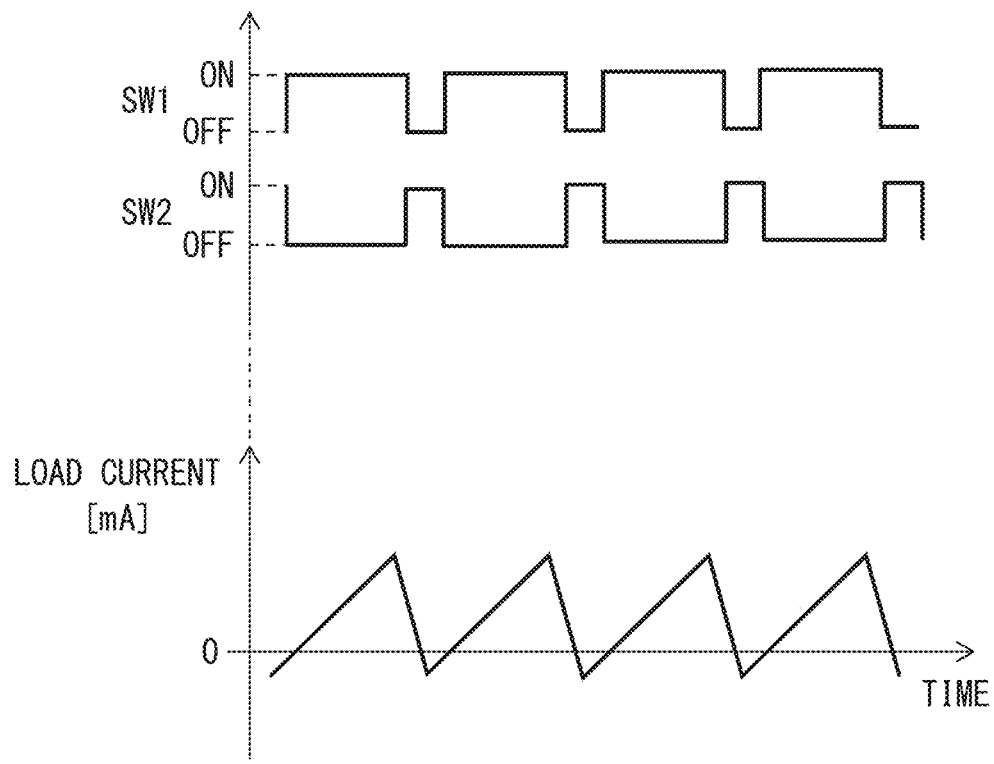
FIG. 6A is a waveform chart illustrating a waveform in a conventional switching regulator circuit with synchronous rectification when the switching devices are turned on and off at a low switching frequency when the load current is small.
Figure 6B:
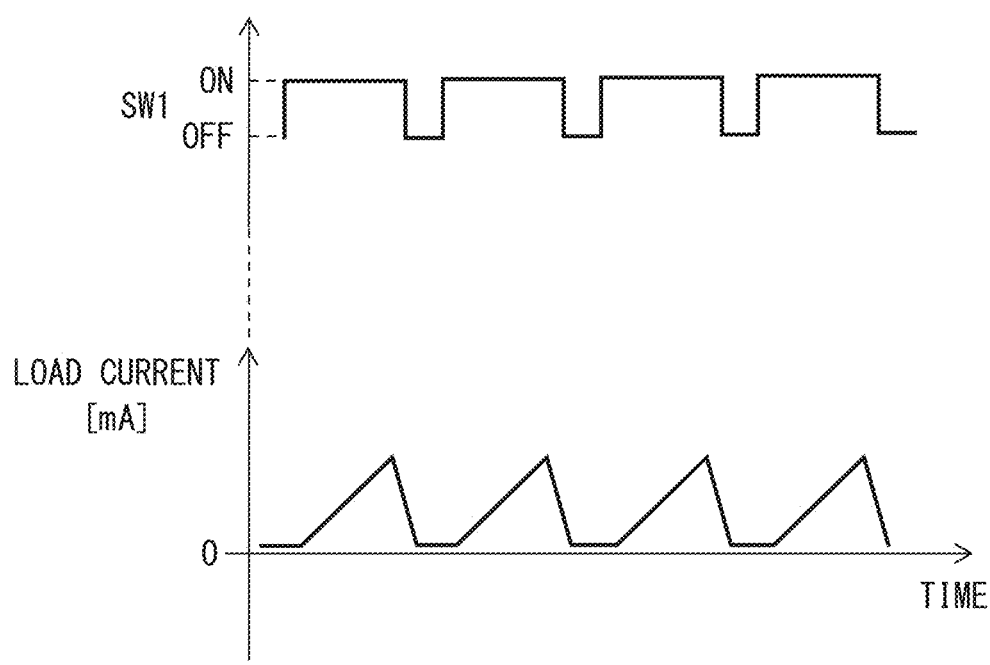
FIG. 6B is a waveform chart illustrating a waveform in a conventional switching regulator circuit with non-synchronous rectification when the switching devices are turned on and off at a low switching frequency when the load current is small.

FIG. 6A is a waveform chart illustrating a waveform in a conventional switching regulator circuit with synchronous rectification when the switching devices are turned on and off at a low switching frequency when the load current is small. FIG. 6B is a waveform chart illustrating a waveform in a conventional switching regulator circuit with non-synchronous rectification when the switching devices are turned on and off at a low switching frequency when the load current is small. A lower switching frequency set for suppressing the heat emission will increase the ripple current. In particular, when the load current is small, a large ripple current will occur, causing the load current to be negative in some periods. As illustrated in FIG. 6A, in the case of a switching regulator circuit with synchronous rectification, the efficiency declines because the load current flows backward from the load to the switching regulator circuit during the periods in which the load current is negative. Further, as illustrated in FIG. 6B, in the case of a switching regulator circuit with non-synchronous rectification, the operation of the switching regulator circuit will be unstable because no current flows from the switching regulator circuit to the load during the periods in which the load current is negative.

In the present embodiment, as illustrated in FIG. 5A, when the load current is small, a switching frequency high enough to prevent the load current with the ripple current from going negative is set for the switching devices SW1 and SW2, in contrast to the conventional examples illustrated in FIG. 6A and FIG. 6B. As will be described below, the level of switching frequency for a small load current can be determined before actually being used the switching regulator circuit 1.

The ripple current is determined by the inductance of the coil 23 and the switching frequency for the switching device. Normally, in the switching regulator circuit 1, the inductance of the coil 23 is not changed during operation and remains constant. Therefore, the level of ripple current can be changed by changing the switching frequency. Thus, it is possible to observe the relation between the load current, which is the current outputted from the output terminal 22 of the switching regulator circuit 1, and the switching frequency by connecting a load 2 that lowers the load current expected in the actual operation to the switching regulator circuit 1 and experimentally turning on and off the switching device at various switching frequencies. Based on the result of this observation, some switching frequencies may be found that do not cause the load current including the ripple current to be negative and a switching frequency for the small load current may be selected from among these frequencies.

As described above, according to the present embodiment, upon turning on the switching regulator circuit 1, information on the load current passing the load connected to the switching regulator circuit 1 is acquired and the switching frequency for the switching device is set at a smaller value for a larger load current. In the present embodiment, in the case of a large load current, a low switching frequency is set in order to suppress the heat emission from the switching device and, in the case of a small load current, a high switching frequency is set in order to lower the ratio of the ripple current to the load current. According to the present embodiment, it is possible to suppress both the heat emission from (the switching device of) the switching regulator circuit 1 and the ripple current included in the output current of the switching regulator circuit 1 in response to the load 2 to be connected to the switching regulator circuit 1.

Further, according to the present embodiment, upon turning on the switching regulator circuit 1, the processes of acquiring and determining the level of the load current and setting the switching frequency based on the result of the determination are executed and then the switching regulator circuit 1 starts to output the output voltage $V_{out}$. Therefore, the switching frequency will not be changed in real time during the output of the output voltage $V_{out}$ by the switching regulator circuit 1, the output voltage $V_{out}$ from the switching regulator circuit 1 will not be unstable, and as a result there will be no adverse effects on the load (apparatus) connected to the switching regulator circuit.

For example, a switching regulator circuit is used in a motor drive apparatus as a control power supply for the operation of the control system. When used as a control power supply for a motor drive apparatus, the switching regulator circuit 1 according to the present embodiment allows stable supply of drive power to the control system of the motor drive apparatus, preventing a decrease in motor control accuracy caused by the switching regulator circuit.

Next, some configurations of the load information acquisition unit 14 of the switching regulator circuit 1 according to one embodiment of the present disclosure will be described. Here, a first to a third configurations will be described with respect to a switching regulator circuit 1 with synchronous rectification but these configurations are also applicable to a switching regulator circuit 1 with non-synchronous rectification.

Figure 7:
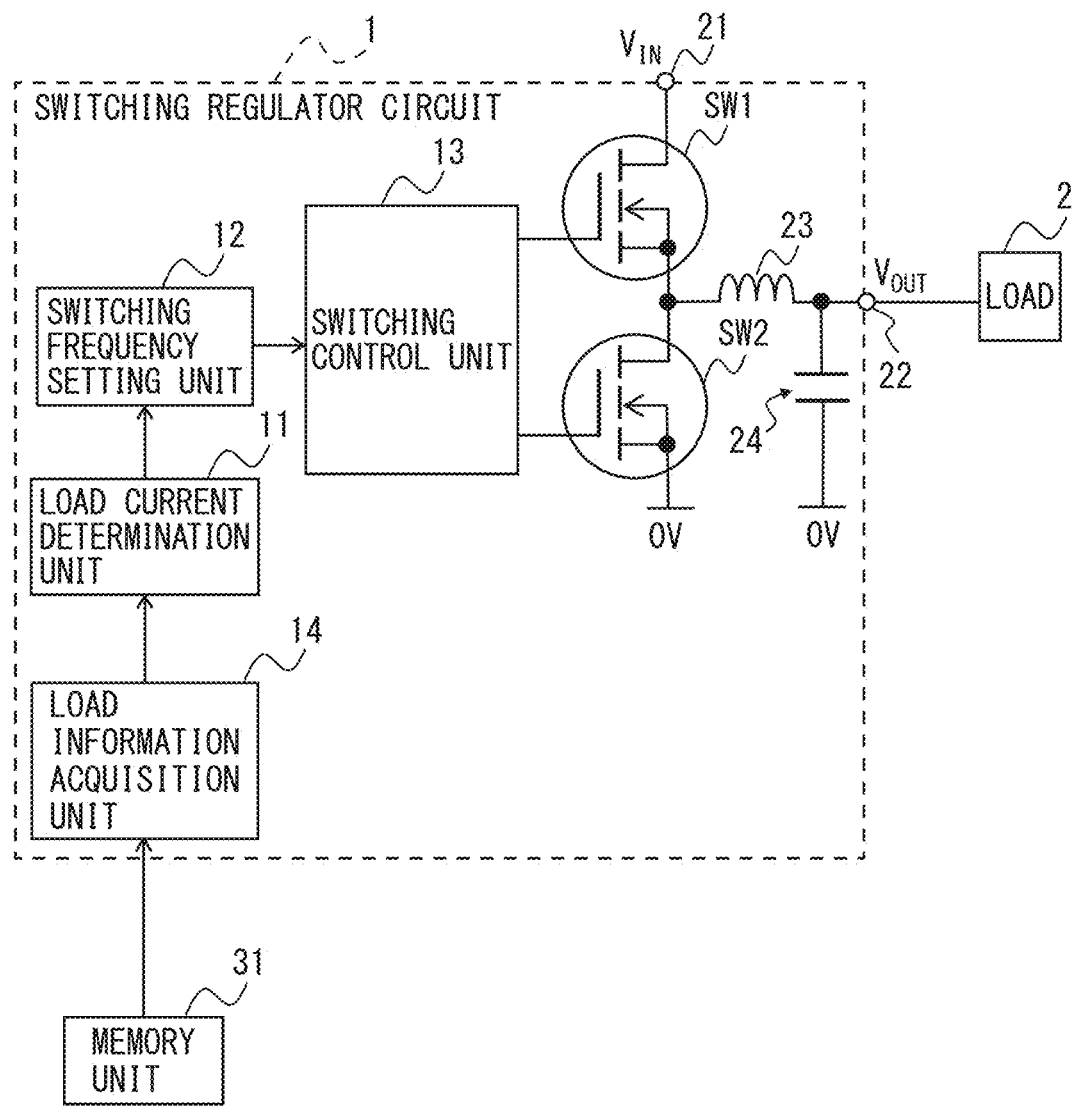
FIG. 7 is a diagram illustrating a switching regulator circuit according to one embodiment of the present disclosure with a load information acquisition unit according to a first configuration.

FIG. 7 is a diagram illustrating a switching regulator circuit according to one embodiment of the present disclosure with a load information acquisition unit according to a first configuration.

Information on the load current is stored in a memory unit 31 provided in the machine apparatus in which the switching regulator circuit 1 is provided. The load information acquisition unit 14 according to a first configuration acquires information on the load current from the memory unit 31 when the switching regulator circuit 1 is turned on. The machine apparatus in which the memory unit 31 is provided can be the same apparatus as the load 2 and, in such a case, the memory unit 31 is provided in the load 2. The memory unit 31 is configured by electrically erasable and programmable nonvolatile memory such as EEPROM (registered trademark) or random access memory readable and writable at high speeds such as, for example, DRAM and SRAM. For example, the level of the load current passing the load 2 connected to the switching regulator circuit 1 is measured before the actual operation of the switching regulator circuit 1 and the information on the load current (i.e., the level of the load current) is stored in the memory unit 31 in advance via an input apparatus (not illustrated). The input apparatus may be a keyboard, touch panel, mouse, voice recognition apparatus, or the like. The input apparatus may be a separate input apparatus or may be an input apparatus attached to the machine apparatus in which the memory unit 31 is provided or to the load 2.

Figure 8:
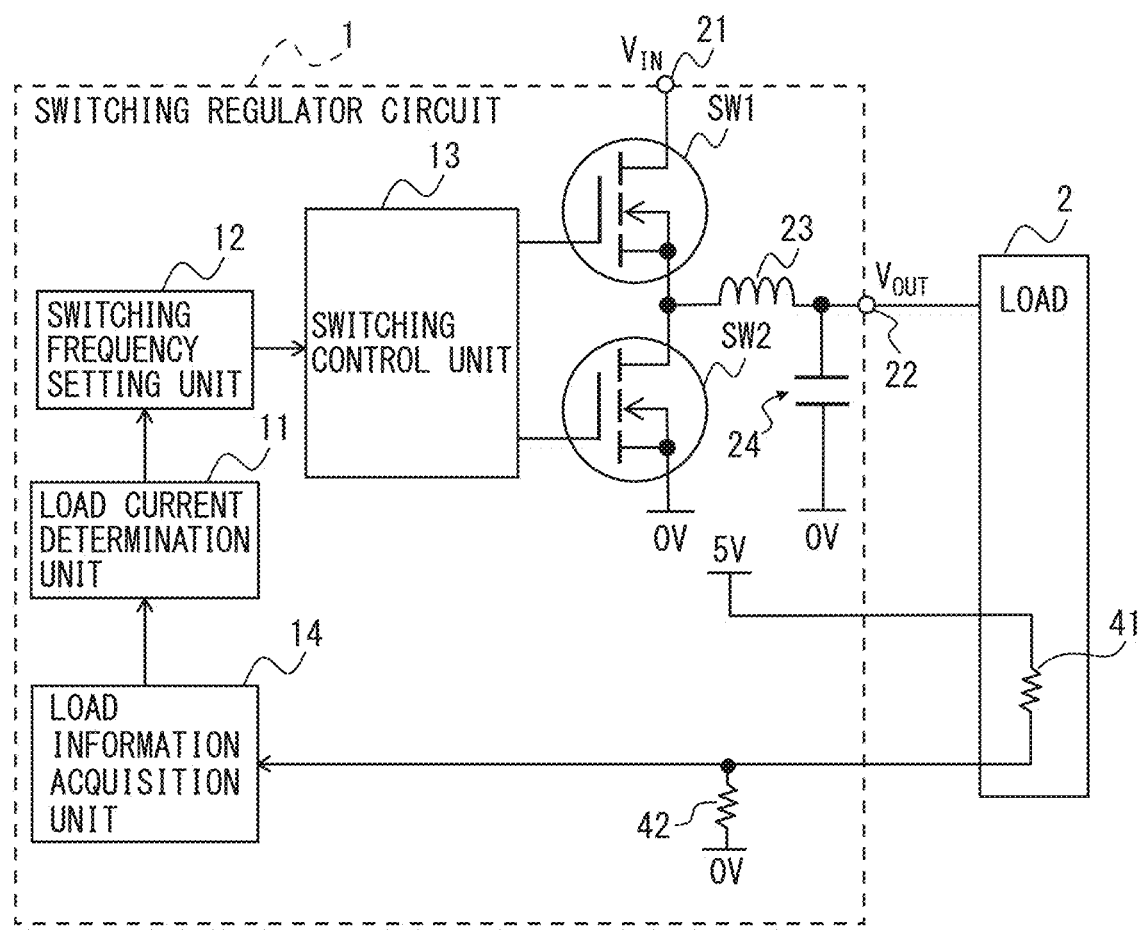
FIG. 8 is a diagram illustrating a switching regulator circuit according to one embodiment of the present disclosure with a load information acquisition unit according to a second configuration.

FIG. 8 is a diagram illustrating a switching regulator circuit according to one embodiment of the present disclosure with a load information acquisition unit according to a second configuration.

A load information acquisition unit 14 according to a second configuration acquires information on the load current from the load 2 connected to the switching regulator circuit 1. A resistor 41 in the load 2, which receives supply of drive power from the switching regulator circuit 1, and a resistor 42 inside the switching regulator circuit 1 are connected in series and a designated voltage (e.g. 5 V) is applied across the resistors 41 and 42. The load information acquisition unit 14 reads one of the voltages divided between the resistor 41 and the resistor 42 (the voltage across the resistor 42 in FIG. 8, for example) and calculates the current value from this voltage value to acquire information on the load current (i.e. the level of the load current). The resistor 41 in the load 2 may be newly provided to acquire information on the load current or may be a resistor already existing in the load 2.

Figure 9:
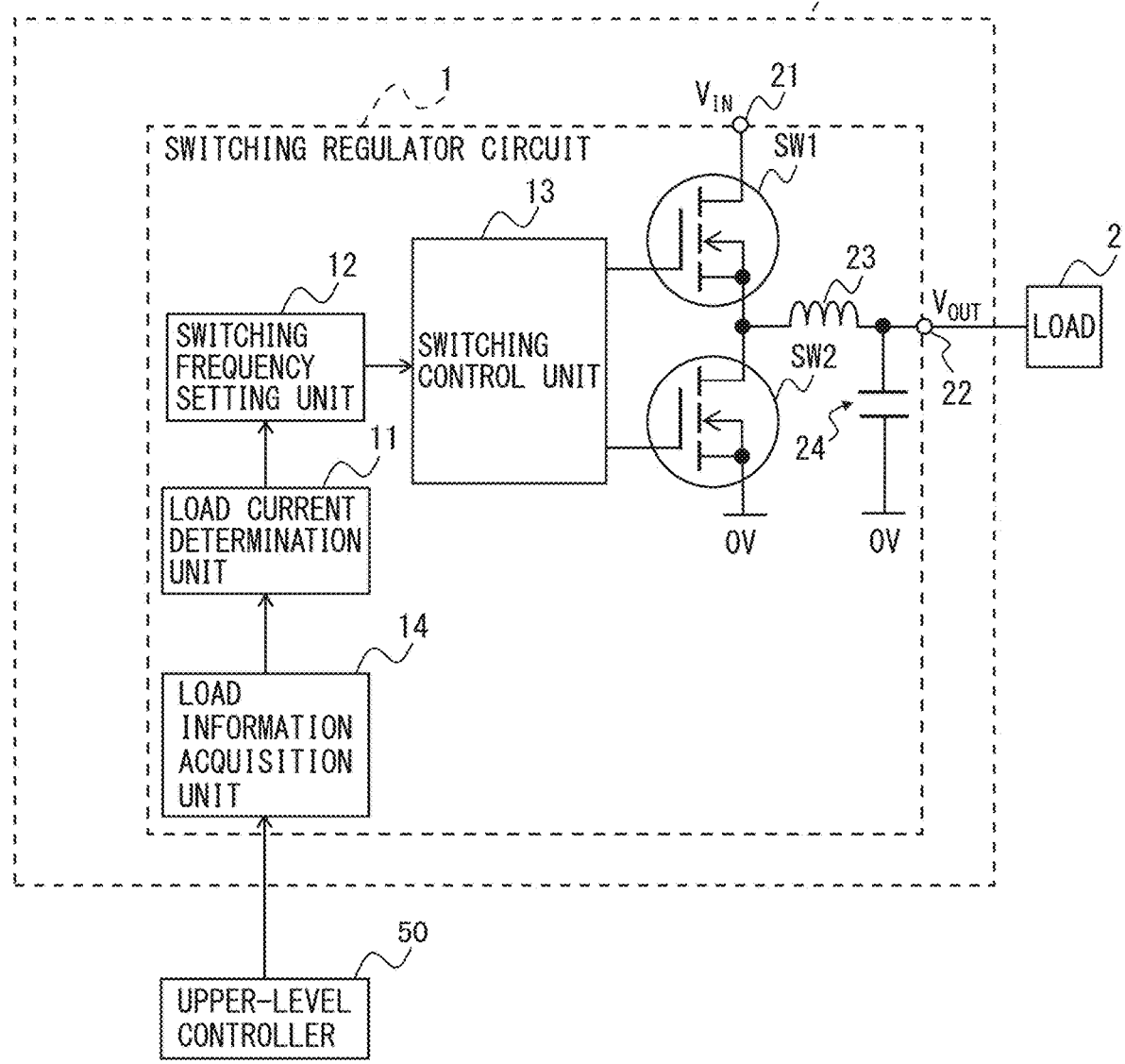
FIG. 9 is a diagram illustrating a switching regulator circuit according to one embodiment of the present disclosure with a load information acquisition unit according to a third configuration.

FIG. 9 is a diagram illustrating a switching regulator circuit according to one embodiment of the present disclosure with a load information acquisition unit according to a third configuration.

Information on the load current is stored in an upper-level controller 50 for the motor drive apparatus 100 for which a switching regulator circuit 1 is provided. A load information acquisition unit 14 according to a third configuration acquires information on the load current from the upper-level controller 50 when the switching regulator circuit 1 is turned on. The upper-level controller 50 may be, for example, a computer numerical control (CNC) apparatus for controlling the machine tool for which the motor drive apparatus 100 is provided, a product management apparatus supervising a plurality of CNC machines, or the like. The upper-level controller 50 may be configured by, for example, a software program or a combination of various electric circuits and a software program. For example, when the upper-level controller 50 is configured by a software program, the function of the upper-level controller 50 can be carried out by operating an arithmetic processing unit according to the software program. Alternatively, the upper-level controller 50 may be configured by a semiconductor integrated circuit with a software program written therein for carrying out the functions of the upper-level controller 50. When two or more switching regulator circuits 1 are provided in order to supply drive power to two or more loads 2 provided inside the motor drive apparatus 100 and attachments thereof, the upper-level controller 50 stores information on the load current for each of the loads 2. The switching regulator circuits 1 corresponding to the loads 2 respectively acquire information on the load currents via the load information acquisition unit 14.

In the above-described embodiments, a case has been described in which the load current is compared with two threshold values to determine the level of the load current to allow three switching frequencies to be set; however, one or more threshold values may be used for the determination of the level of the load current. For example, by determining the level of the load current by comparing the load current with one threshold value, two switching frequencies, i.e., high and low frequencies can be set. Further, for example, by determining the level of the load current by comparing the load current with three threshold values, four switching frequencies can be set.

According to one aspect of the present disclosure, a switching regulator circuit suitable for the load to be connected thereto can be achieved.

The invention claimed is:

1. A switching regulator circuit to convert an inputted first voltage to a second voltage by turning on and off a switching device and to output the second voltage to a load, the switching regulator circuit comprising:
   a load current determination unit configured to determine a level of a load current passing the load connected to the switching regulator circuit;
   a switching frequency setting unit configured to set a switching frequency for the switching device according to a result of determination by the load current determination unit; and
   a switching control unit configured to turn on and off the switching device at the switching frequency set by the switching frequency setting unit, wherein
   the load current determination unit is configured to determine the level of the load current, based on a result of comparison of the load current with at least one threshold value, and
   the at least one threshold value is selected based on
   (1) whether the switching regulator circuit is with synchronous rectification or with non-synchronous rectification,
   (2) allowable levels of ripple current occurring in the load current, and
   (3) heat emission generated at the switching device.

2. The switching regulator circuit according to claim 1, wherein the switching frequency setting unit is configured to set the switching frequency at a lower value as the load current increases.

3. The switching regulator circuit according to claim 1, further comprising a load information acquisition unit configured to acquire information on the load current in response to turning on the switching regulator circuit,
    wherein the load current determination unit is configured to determine the level of the load current, based on the information on the load current acquired by the load information acquisition unit.

4. The switching regulator circuit according to claim 3, wherein the information on the load current is stored in a memory unit provided in a machine apparatus in which the switching regulator circuit is provided, and
    wherein the load information acquisition unit is configured to acquire the information on the load current from the memory unit.

5. The switching regulator circuit according to claim 4, wherein the memory unit is provided in the load.

6. The switching regulator circuit according to claim 4, wherein the level of the load current is measured before an operation of the switching regulator circuit, and information on the measured level of the load current is stored in the memory unit in advance.

7. The switching regulator circuit according to claim 3, wherein the load information acquisition unit is configured to acquire the information on the load current from the load connected to the switching regulator circuit.

8. The switching regulator circuit according to claim 7, wherein the load information acquisition unit is configured to acquire the information on the load current from a resistor included in the load connected to the switching regulator circuit.

9. The switching regulator circuit according to claim 3,
    wherein the information on the load current is stored in an upper-level controller of a motor drive apparatus in which the switching regulator circuit is provided, and
    wherein the load information acquisition unit is configured to acquire the information on the load current from the upper-level controller.

* * * * *